(12) United States Patent
Tianchon

(10) Patent No.: US 8,878,382 B2
(45) Date of Patent: Nov. 4, 2014

(54) POWER GENERATION SYSTEM OR TURBINE WITH POTENTIAL ENERGY GAIN

(76) Inventor: Carmelito B. Tianchon, Rosedale, NY (US)

( * ) Notice: Subject to any disclaimer, the term of this patent is extended or adjusted under 35 U.S.C. 154(b) by 702 days.

(21) Appl. No.: 12/799,202

(22) Filed: Apr. 20, 2010

(65) Prior Publication Data

US 2010/0276943 A1  Nov. 4, 2010

Related U.S. Application Data

(60) Provisional application No. 61/214,151, filed on Apr. 20, 2009, provisional application No. 61/278,813, filed on Oct. 13, 2009.

(51) Int. Cl.
*F03D 9/00* (2006.01)
*H02K 53/00* (2006.01)

(52) U.S. Cl.
CPC *H02K 53/00* (2013.01); *Y02B 10/30* (2013.01)

USPC ........................................................ 290/54

(58) Field of Classification Search
USPC .................................................... 290/54–55
See application file for complete search history.

(56) References Cited

U.S. PATENT DOCUMENTS

| 6,097,104 | A  | * | 8/2000 | Russell | 290/54 |
| 6,201,313 | B1 | * | 3/2001 | Nakamats | 290/54 |
| 7,615,884 | B2 | * | 11/2009 | McMaster | 290/55 |
| 2010/0072752 | A1 | * | 3/2010 | Park et al. | 290/52 |
| 2011/0089695 | A1 | * | 4/2011 | Krouse et al. | 290/52 |
| 2011/0095533 | A1 | * | 4/2011 | Reagan | 290/52 |

* cited by examiner

Primary Examiner — Truc Nguyen

(57) ABSTRACT

A power generation system or turbine with energy gain (turgain) comprising an enclosure and a rotor with potential energy gain that efficiently converts a predetermined mass to kinetic energy; and use the energy having a zero emission to power the generators for what further is a scalable, clean, renewable, reliable, affordable, and practical power (scrrapp) system with the potential to boosts a sustainable economic growth and cost-effectively address climate change.

14 Claims, 18 Drawing Sheets

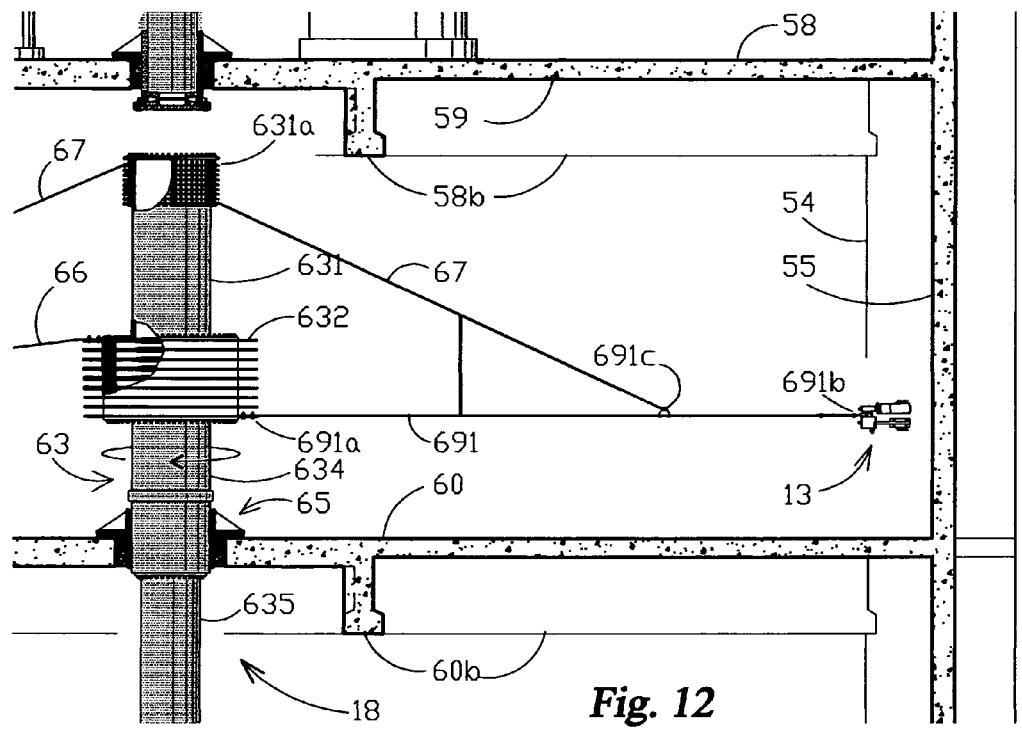
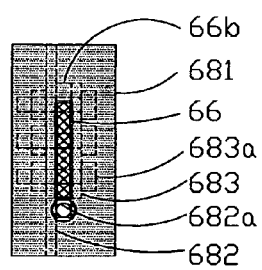
Fig. 11
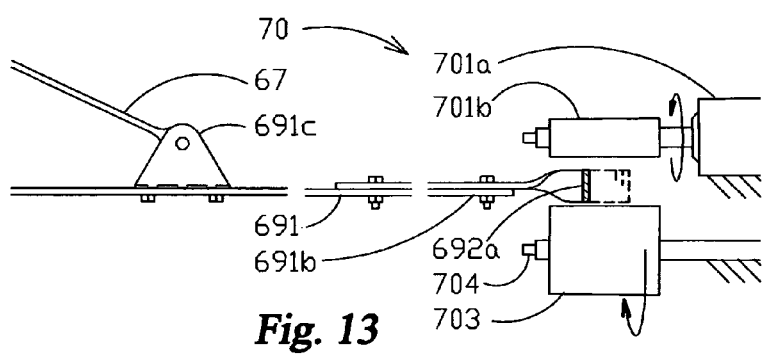
Fig. 12
Fig. 13

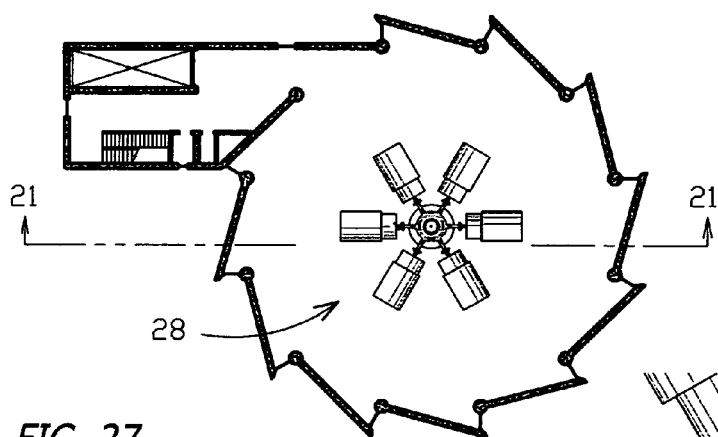
FIG. 27
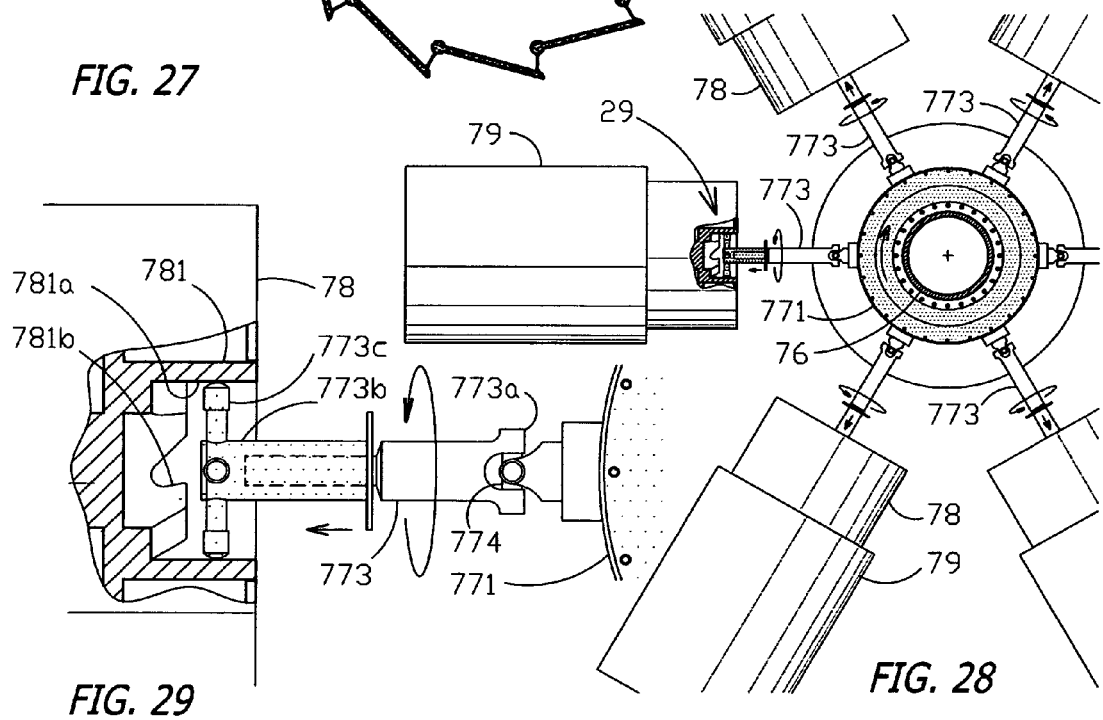
FIG. 29
FIG. 28

POWER GENERATION SYSTEM OR TURBINE WITH POTENTIAL ENERGY GAIN

CROSS-REFERENCE TO RELATED APPLICATIONS

This application claimed the benefit of what is shown and described in previous Provisional applications:
61/214,151 filed Apr. 20, 2009 and;
61/278,813 filed Oct. 13, 2009.

FIELD OF THE INVENTION

This present invention relates to a power generation, particularly, this invention relates to a power generation system or turbine with energy gain (turgain) comprising an enclosure and a rotor with potential energy gain that converts a predetermined mass to kinetic energy; and use the energy having a zero emission to power the generators for what further is a scalable, clean, renewable, reliable, affordable, and practical power (scrrapp) system with the potential to boosts a sustainable economic growth and cost-effectively address climate change.

BACKGROUND OF THE INVENTION

Conventional Power Generators

The majority of the power generation systems are powered by respective heat engine that uses fossil or nuclear fuel to generate electricity and the process in general is relatively longer and quite expensive—say from the procurement of fuel, conversion to heat, to mechanical energy and finally to electricity. In addition, the process continues on waste disposal and dealing with other environmental issues.

Renewables

Other power means are environmentally friendly, hydroelectric and wind turbine in particular. Such generation systems are equipped with a particular rotor that harnessed the potential energy of running water or wind and respectively the process is shorter. And while a hydroelectric power plant is by far our best source for electricity that powers our economy, both the wind turbine and hydroelectric power plant has some constraints as well—the excessive space, water rights, etc.

Potential Energy Gain

The idea of a turbine with potential energy gain is quite misleading. At a glance, it seems to contradict with the laws of Physics and it appears the world had no experienced with this kind of machine ever but the following scenarios may shed some lights.

You may have watched a building under construction lately and had noticed a steel beam which at the midpoint tied to a cable, horizontally suspended in the air by a means and with almost no friction is free to move about the cable. Interestingly, noticed a worker with just his hand pulls the beam at one end and pushes it against the column as he assembled the structure seemingly with ease.

As he pulls and pushes the beam at one end he apply a force, known in Physics as, $F=ma$ or rather in angular momentum, $F=m\ (v^2/r)$, which is a lineal equation. Correspondingly as the beam moves along it generates a kinetic energy. The equation for kinetic energy is exponential, in this case, $E=1;2m\ r^2\ (v/r)^2$, which indicate that its potential kinetic energy may either less or more than the applied force relative to the length of the beam and assumed a high density mass on both ends.

Similarly and given a kind of rotor of different sizes, from small to a very large in diameter and the graph of the two equations shows the mathematical relation of two lines: a parabola which starts quite below a straight line but then it crosses as it goes exponentially upward and towering over a slope, which again indicates that a rotor of the right configuration and orientation, an energy gain is achievable—more on Mechanics later in this specification.

Objective

Knowing that some types of rotor has potential energy gain relative to its configuration and orientation, it is the object of the present invention to provide a turbine that will efficiently convert a predetermined mass to kinetic energy; and use much of the energy to power the electric generators to generate electricity.

SUMMARY OF THE INVENTION

A turbine of the present invention comprises an enclosure and a rotor with potential energy gain, wherein the rotor is driven peripherally by an appropriate initiator drive system equipped with small electric motor connected to a power.

An Enclosure

An enclosure could either be a building or an offshore structure or a large ocean-going vessel but at least an enclosure, wherein said enclosure comprising at least of a bottom floor, a peripheral upright member, and a ceiling. Said ceiling defined as a predetermined horizontal plane aligned with the upper-end or top of said rotor and wherein a space is created between said bottom floor and ceiling.

Preferably said enclosure is provided with at least one intermediate floor, which created a space between the intermediate floor and bottom floor, and another space between the intermediate floor and ceiling. Also preferred is an access space created below the bottom floor.

A Rotor with Potential Energy Gain

Essentially the rotor of the present invention is a vertical-axis rotor. A vertical-axis rotor circumferentially is equidistance to the horizontal plane or to the earth's center of gravity, wherein it enable the rotor achieved an energy gain having a rotor of the right configuration and the mathematics were favorable.

A rotor with potential energy gain comprises of a vertical shaft member and at least one or a plurality of lateral lever members. Said vertical shaft member having an upper-end and lower-end held coaxially pivotal at a predetermined vertical-axis in said enclosure.

Said plurality of lateral lever members each having a mountable-end and oppositely an effort-end, wherein said mountable-end is attached to said vertical shaft member at a predetermined distance from its lower-end, and wherein said effort-end is configured having a predetermined high density point mass or mass assembly disposed to a predetermined effective horizontal path in space about said vertical-axis.

Said high density point mass or mass assembly defined by a predetermined quantity of matter or mass, and wherein said high density point mass collectively enable said rotor delivered its operational output energy.

Said effective horizontal path defined by the size of the space about said vertical-axis, and wherein said effective horizontal path enable said rotor achieved its potential energy gain.

Said energy gain defined by a positive difference in quantity of energy, wherein said rotor having its output energy correspondingly greater than the required input energy per unit of velocity or at least per unit of initial velocity.

An Initiator Drive System

Said input energy that includes a force to cancel potential frictions is relatively a small and sustained input energy or force applied on said rotor by an appropriate initiator drive system, wherein said initiator drive system comprising a rim member, a plurality of lateral spoke members each having a mountable-end and oppositely an effort-end, and plurality of space apart stationary drive assemblies.

Said mountable-end is attached to said vertical shaft member at a predetermined distance from its lower-end. Said effort-end disposed to a predetermined effective horizontal path in space about said vertical-axis and attached to said rim member that unitary defined a wheel assembly.

Said plurality of space apart stationary drive assemblies each attached to a respective peripheral upright member supporting said wheel assembly, wherein said stationary drive assembly is powered by small electric motor connected to a power, and wherein said stationary drive assembly in a timely manner drives said wheel assembly about said vertical-axis.

BRIEF DESCRIPTION OF THE DRAWINGS

FIG. 11, a section view thru line 11-11 of FIG. 10,

FIG. 12, an enlarged partial view at point 12 of FIG. 8;

FIG. 13, an enlarged partial view at point 13 of a stationary drive assembly 70 of FIG. 12;

FIG. 21 to FIG. 31, were cancelled;

ILLUSTRATIVE EMBODIMENT

Figure 1:
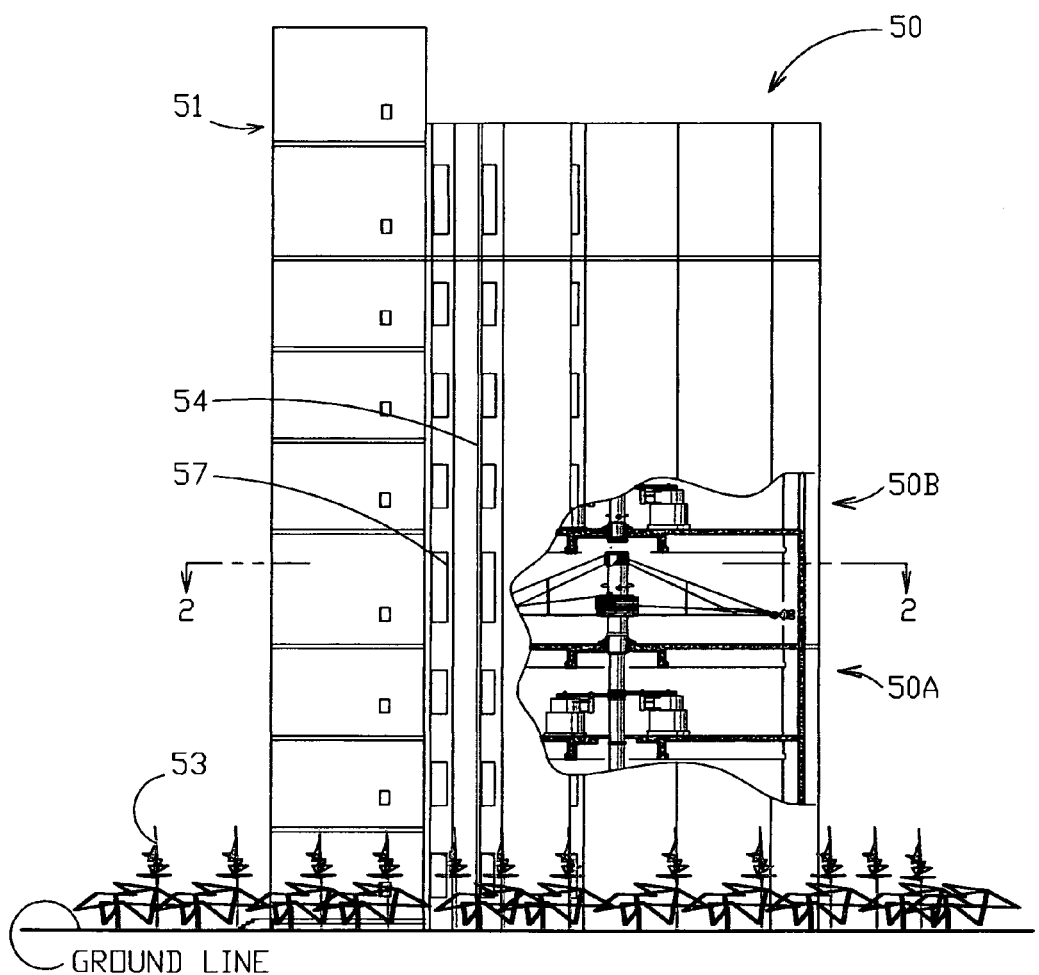
FIG. 1, an elevation view of an enclosure in the form of a building with a cut-out showing a partial interior view of the turbine, according to the present invention.

Accordingly the invention will now be described, by way of example, with reference to the accompanying drawings and equations, in which:

FIG. 1, is the elevation view of an illustrative embodiment, an enclosure in the form of a building 50, with a cut-out view of the interior of turbines 50A and 50B. The building further has an optional service space 51 and optional plants or trees 53.

An Enclosure

Figure 2:
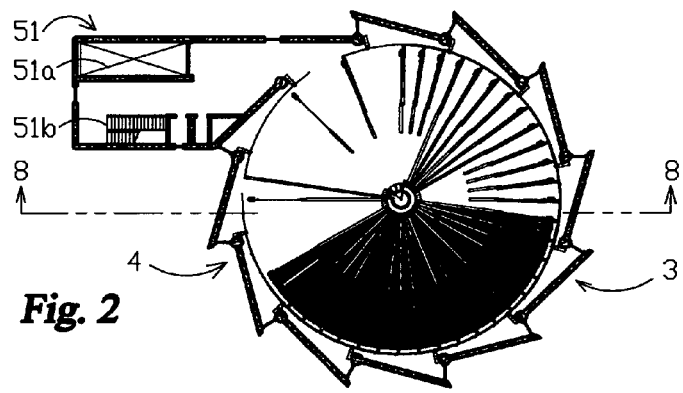
FIG. 2, a section thru line 2-2 of FIG. 1.
Figure 3:
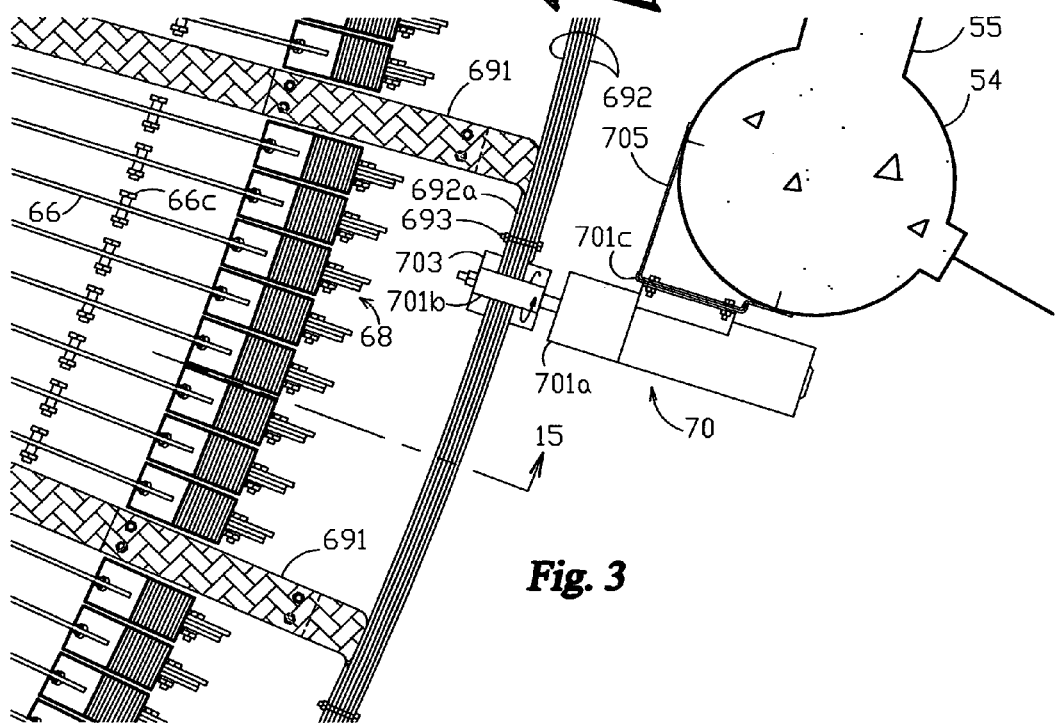
FIG. 3, an enlarged partial view at point 3 of FIG. 2.
Figure 4:
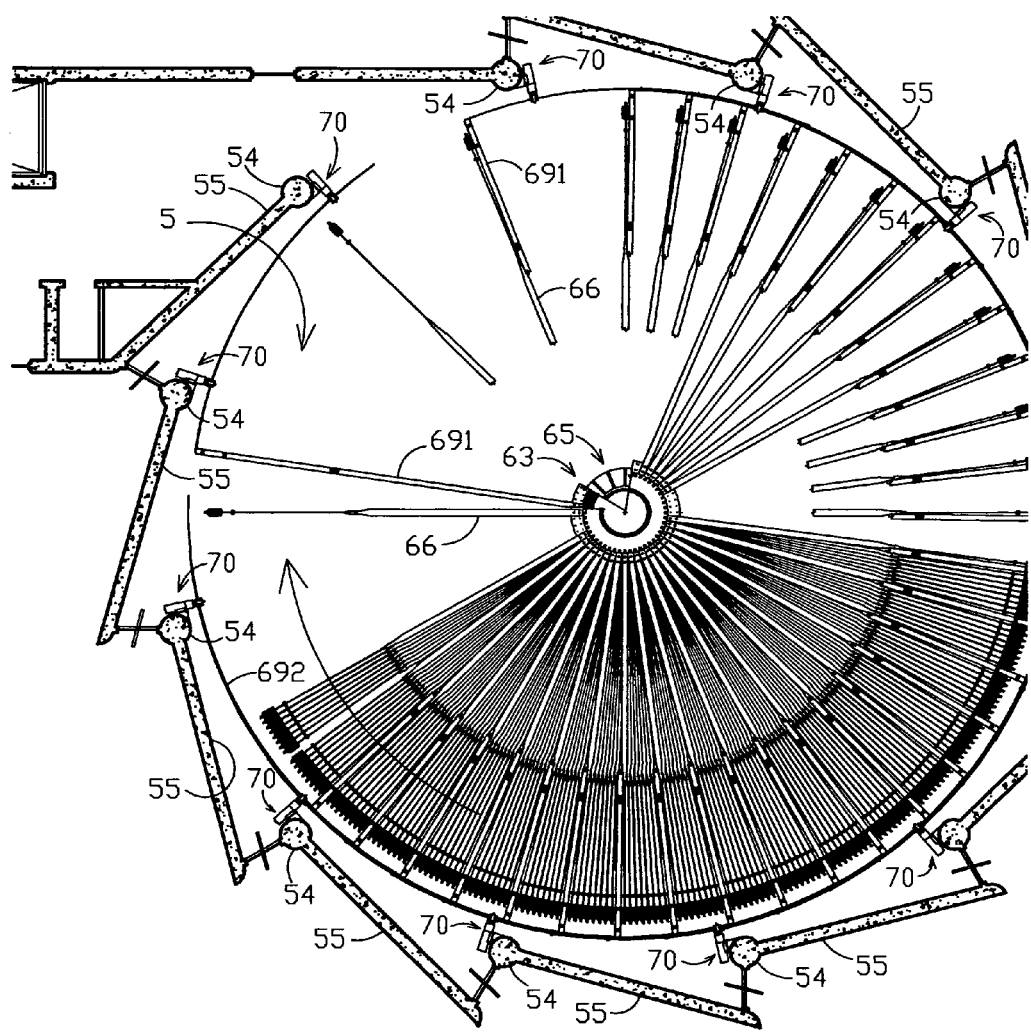
FIG. 4, an enlarged partial view of FIG. 2.
Figure 6:
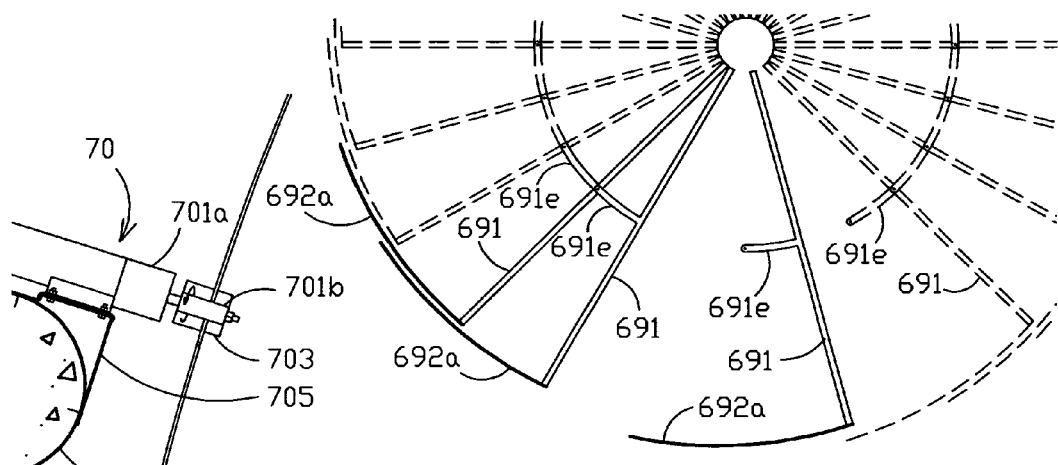
FIG. 6, an alternate detail of the spoke members of FIG. 4.
Figure 5:
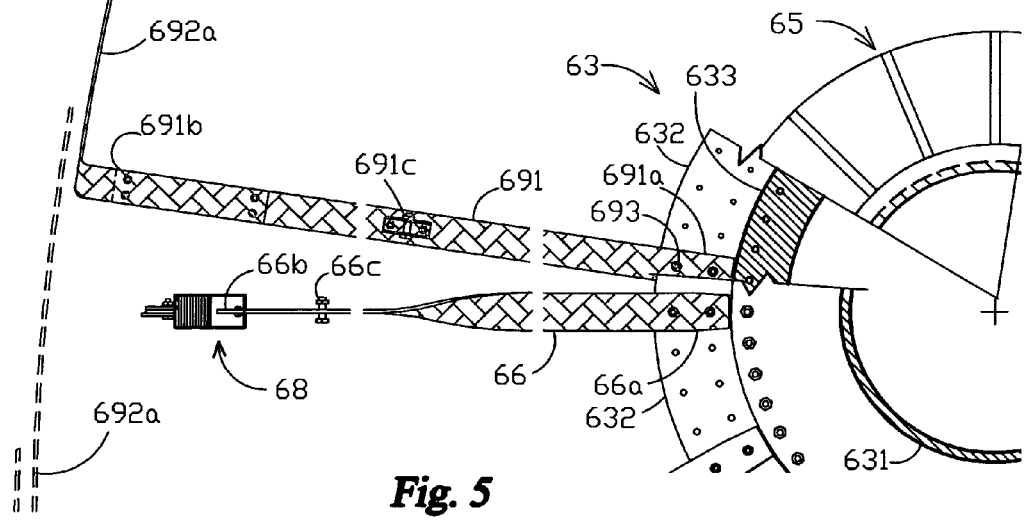
FIG. 5, further an enlarged view at point 5 of FIG. 4.

FIG. 2, 3 and 4 are layouts of a building 50, particularly a floor layout of said enclosure comprising a plurality of spaced apart columns 54, walls 55, and said optional service space 51, which houses an elevator 51*a*, and stair 51*b*.

The said columns are made of reinforced concrete or equivalent measured across the said floor and from a predetermined common point, and on said common point there's an imaginary vertical line which referred to as the vertical-axis.

Figure 8:
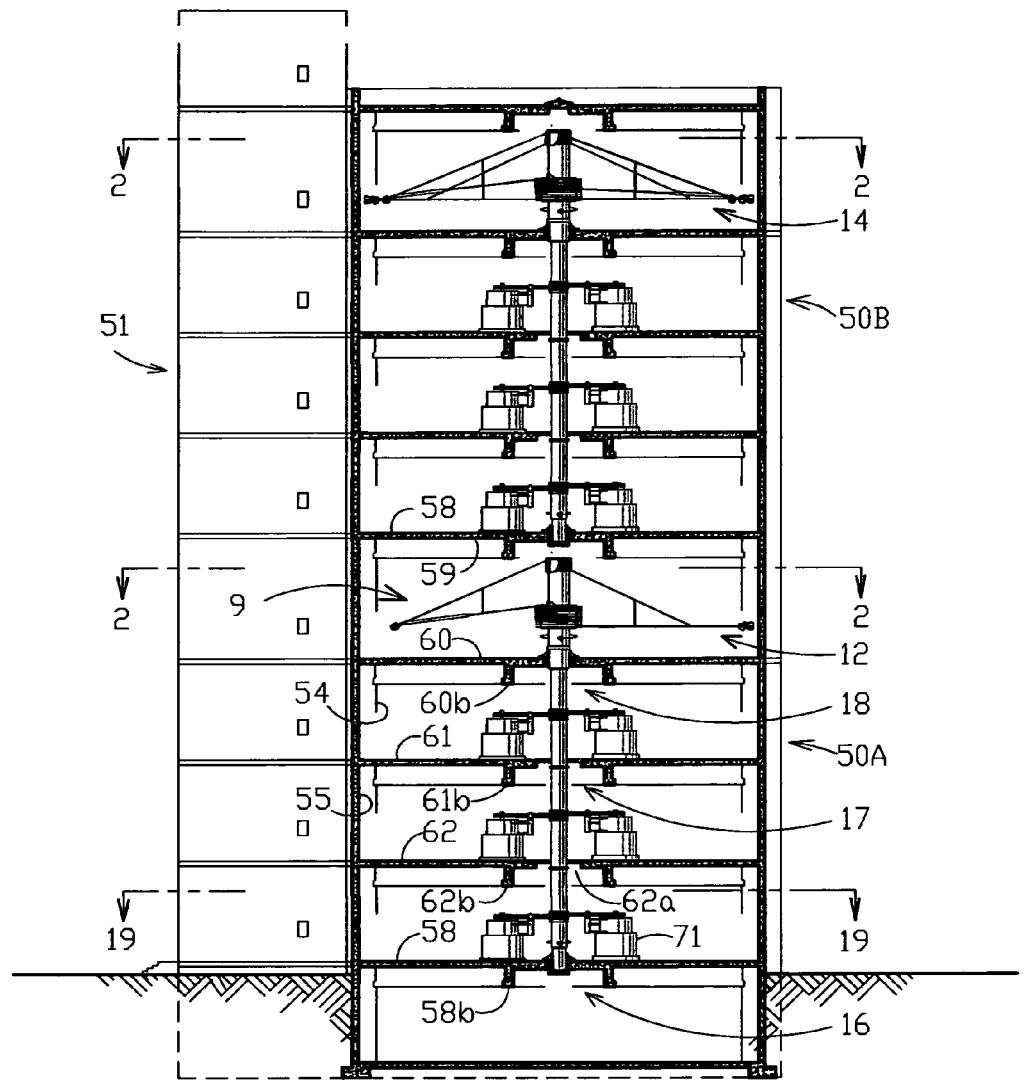
FIG. 8, a cross section view thru line 8-8 of FIG. 2.
Figure 9:
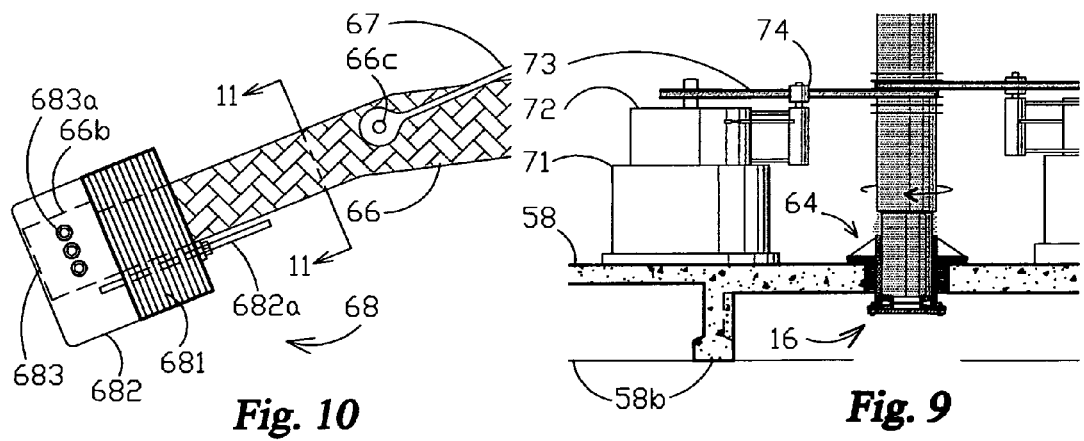
FIG. 9, an enlarged partial view at point 9 of FIG. 8.
Figure 14:
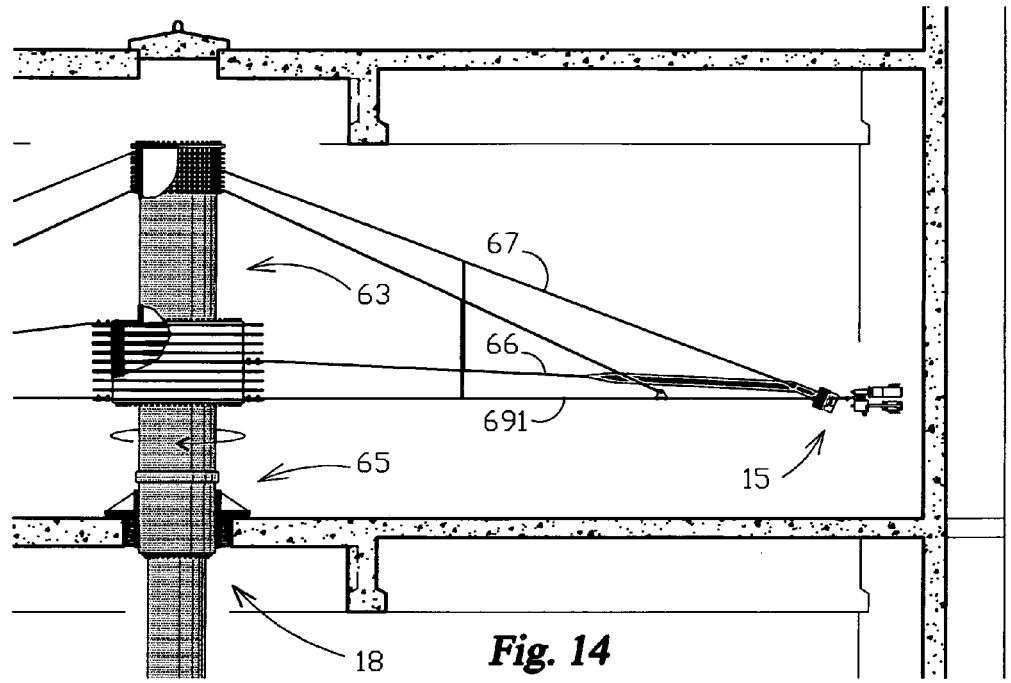
FIG. 14, an enlarged partial view at point 14 of FIG. 8.

FIG. 8, 9 and 12, said column and wall members were shown along with a bottom floor 58, a ceiling, a roof or top member 59, and an intermediate floor or bridge member 60, wherein said bottom and intermediate floors respectively were pre-equipped with pivotal means 64, and 65. The said roof is either directly connected to or detached from said wall or column but at least it protects the said rotor from the elements.

As mentioned previously, said ceiling defined as a predetermined horizontal plane aligned with the upper-end of the rotor or aligned with height of the rotor. The space between the upper-end of the rotor and top member 59 defined as an access space, wherein said access space facilitates the installation and future maintenance of said pivotal means and the vertical shaft member it support.

Figure 17:
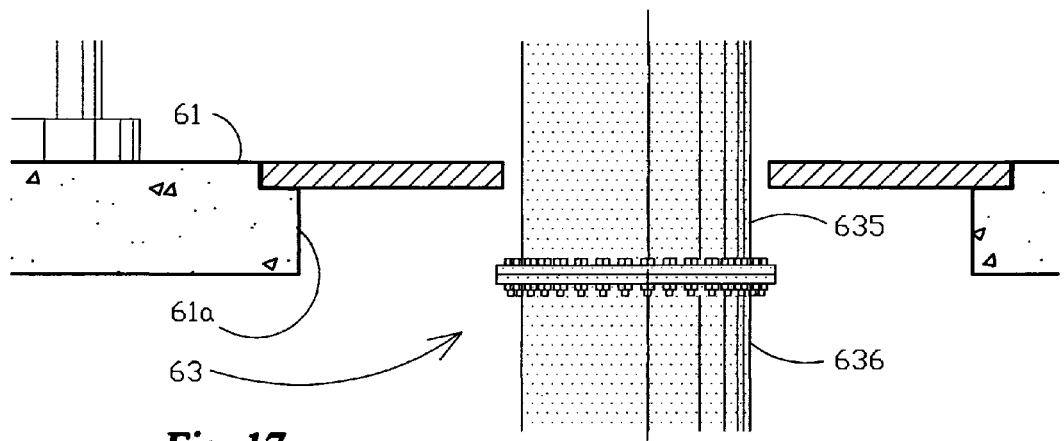
FIG. 17, an enlarged partial view at point 17 of FIG. 8.

Additional intermediate floor members 61, and 62, were provided to accommodate the additional electric generators equipped with respective shaft raceway 61*a*, 62*a*, adapted coaxially at said vertical-axis, FIG. 8 and 17. As mentioned previously, said floor members or at least an intermediate floor 60 defined by a predetermined effective horizontal path or by the size of the space, wherein it enable said rotor achieved its potential energy gain.

Floor members are made of concrete or equivalent and provided with beam members 58*b*, 59*b*, 60*b*, 61*b*, and 62*b*, disposed respectively between respective said columns and across said floors, FIG. 8 and 9. Alternately, beam members may be replaced by an intermediate columns (not shown on drawings) if found desirable.

A Rotor with Potential Energy Gain

FIG. 8 is a section view thru line 8-8 of FIG. 2. A building 50, comprising of turbines 50A and 50B, disposed one above the other and further illustrates how the present invention may optimized the value of a parcel of land particularly for a power generation system installed in the urban area.

FIGS. 9, 12, 14, 16, 17 and 18, are enlarged views of said turbine, particularly a rotor with potential energy gain comprising of a vertical shaft member 63, and a plurality of lateral lever members 66. The said vertical shaft member having an upper-end and lower-end held pivotal by a pair of pivotal means 64, and 65, respectively disposed coaxially about said vertical-axis.

Figure 16:
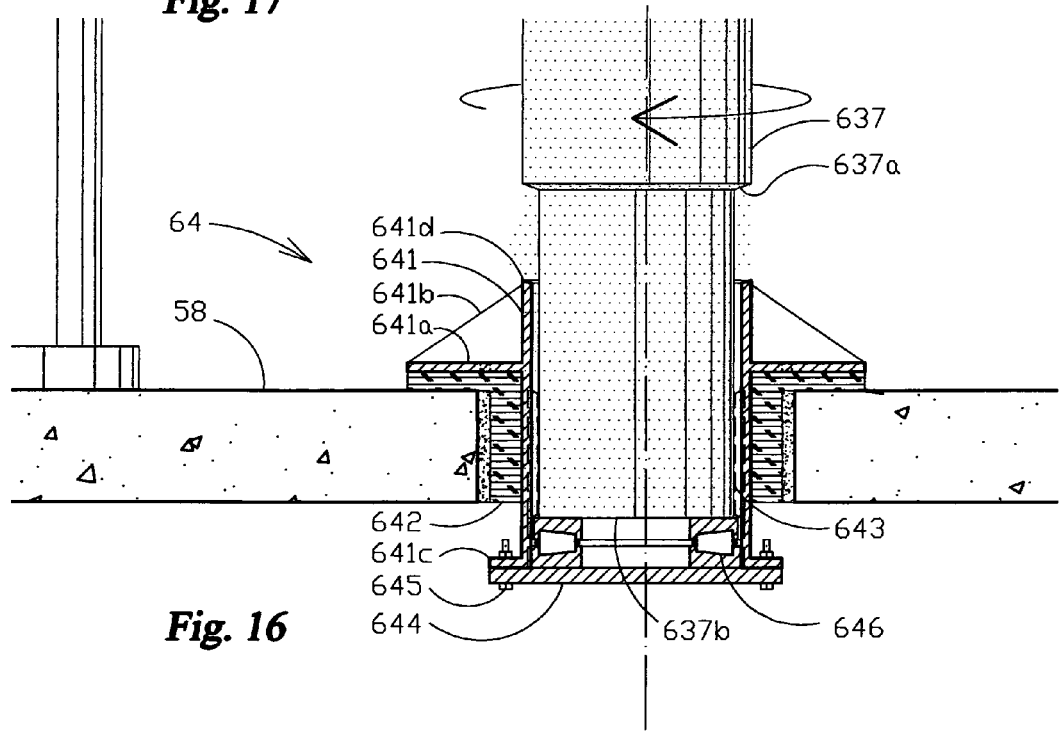
FIG. 16, an enlarged view at point 16 of FIGS. 8 and 9.
Figure 18:
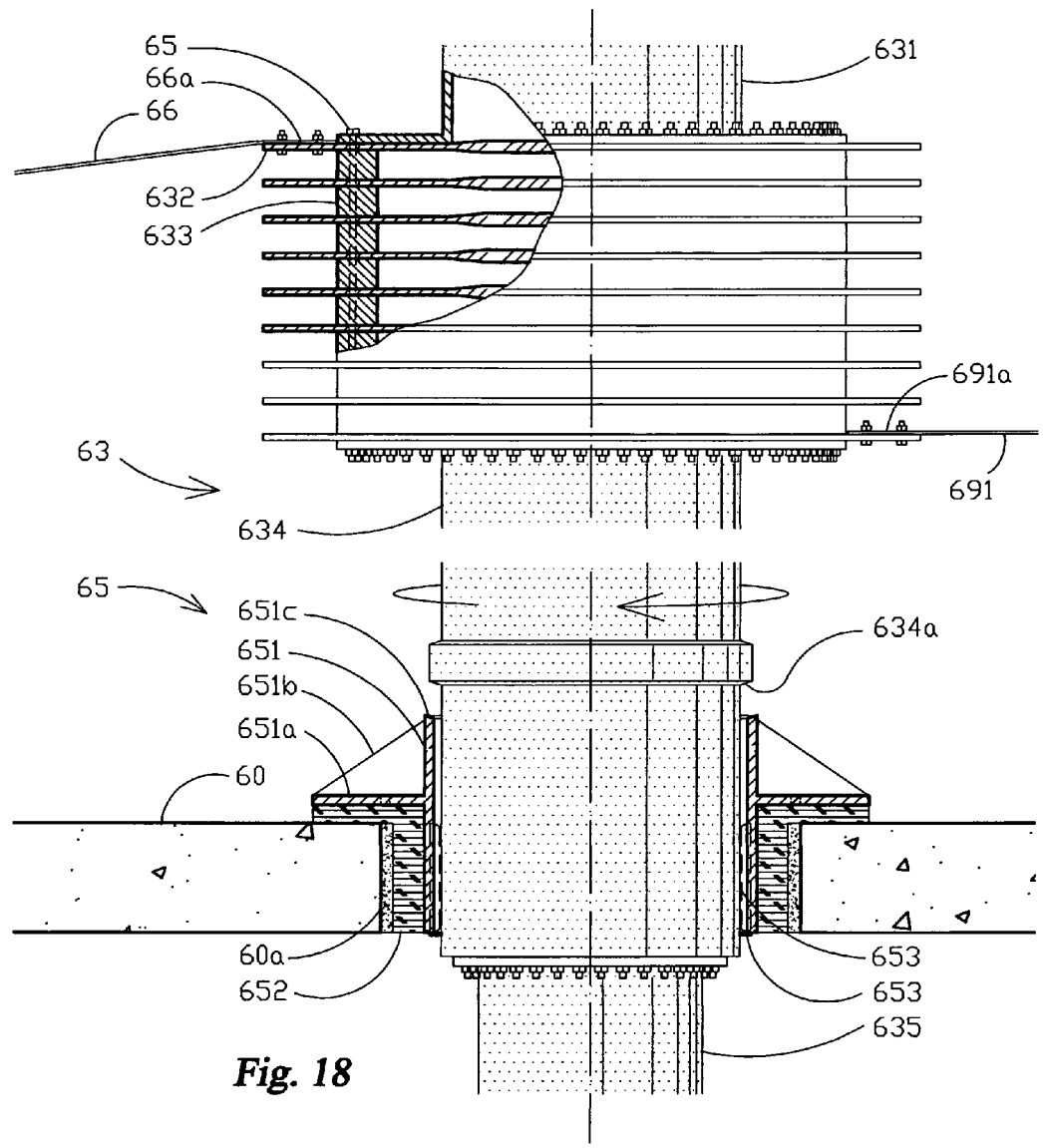
FIG. 18, an enlarged partial view at point 18 of FIGS. 8, 9, 12 and 14.

FIGS. 16 and 18, said pivotal means 64 and 65 comprises respectively of members 641 to 646 and 651 to 653 but not described in this specification for reason of brevity and are beyond the scope of the invention.

FIGS. 16, 17 and 18, said vertical shaft member comprising sections of cylindrical steel or equivalent but not limited to, an upper portion 631, hubs 632, spacers 633, a lower portion 634, and extension portions 635, 636, and 637, which all together assembled preferably at the job site to facilitate the handling and delivery. Said hubs and spacers may be replaced by an alternative shaft configuration, preferably having instead a hollow cylindrical body and the said lateral lever member adapted to butts directly through said cylinder and secured with means from the inside of said vertical shaft member.

The vertical shaft member further defined by its capacity to hold said lateral lever members in placed and enable the transferred of torque of said rotor, regardless of the kind of mounting means employed, regardless of its configuration and regardless of the kind of material used but within the scope and spirit of the present invention.

Still from FIG. 9, and also FIGS. 4, 5, 6 and 7, said lateral lever members were configured respectively having a mountable-end 66a, and oppositely an effort-end 66b. Said mountable-end radially mounted to a respective hub 632 of said vertical shaft member 63, and said effort-end 66b defined by a predetermined high density point mass or high density mass assembly 68 and disposed to a predetermined effective horizontal path about said vertical-axis.

Figure 7:
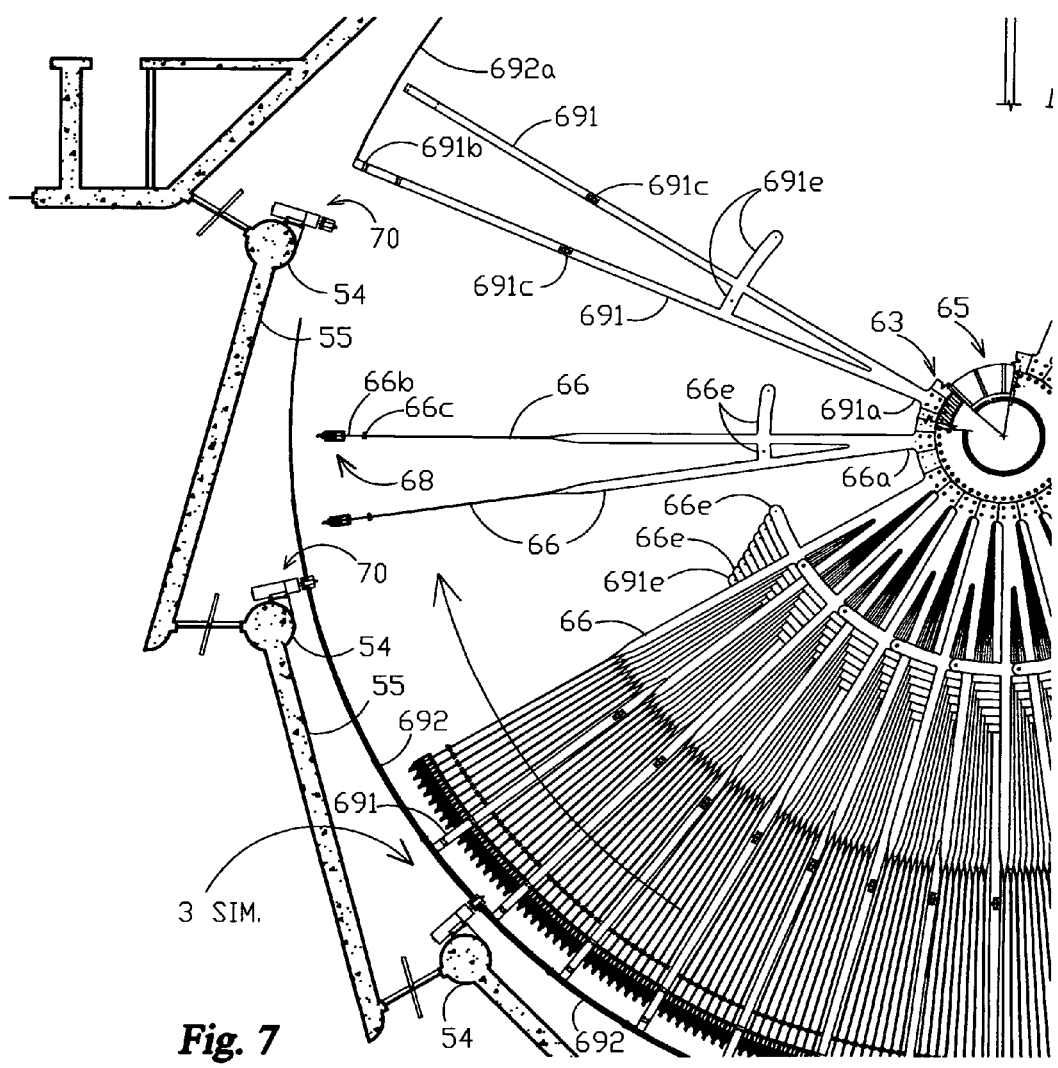
FIG. 7, another alternate detail of spoke and lever members of FIG. 4.

Another lateral lever member configuration is shown in FIG. 7. Accordingly two units of said lateral lever members 66 were combined to a common mountable-end 66a, and preferably with a bridge 66e adapted to connect to the adjacent lever member and formed a unitary rotor assembly.

A pie-shaped lateral lever member may be used as well— say two or more of said lateral lever members (not shown on drawings) were combined into a unitary lateral lever member of a much wider effort-end.

It is also within the scope and spirit of the present invention that said lateral lever members (also not shown on drawings) were combined into an equivalent circumferentially-unitary lateral lever member having a predetermined high density rim, wherein said high density rim circumferentially disposed as well to said effective horizontal path about said vertical-axis.

FIGS. 3, 9, 10, 11 and particularly FIG. 9, said lateral lever member has an optional stay member 67, attached to means 66c of said lateral lever member and to means 631a of said vertical shaft member supporting it against the gravity and into a state of equilibrium.

Stay member may also come in different material, shape, size, particularly; a cable wire, a steel rod, or an appropriate panel-shaped stay.

Figure 10:
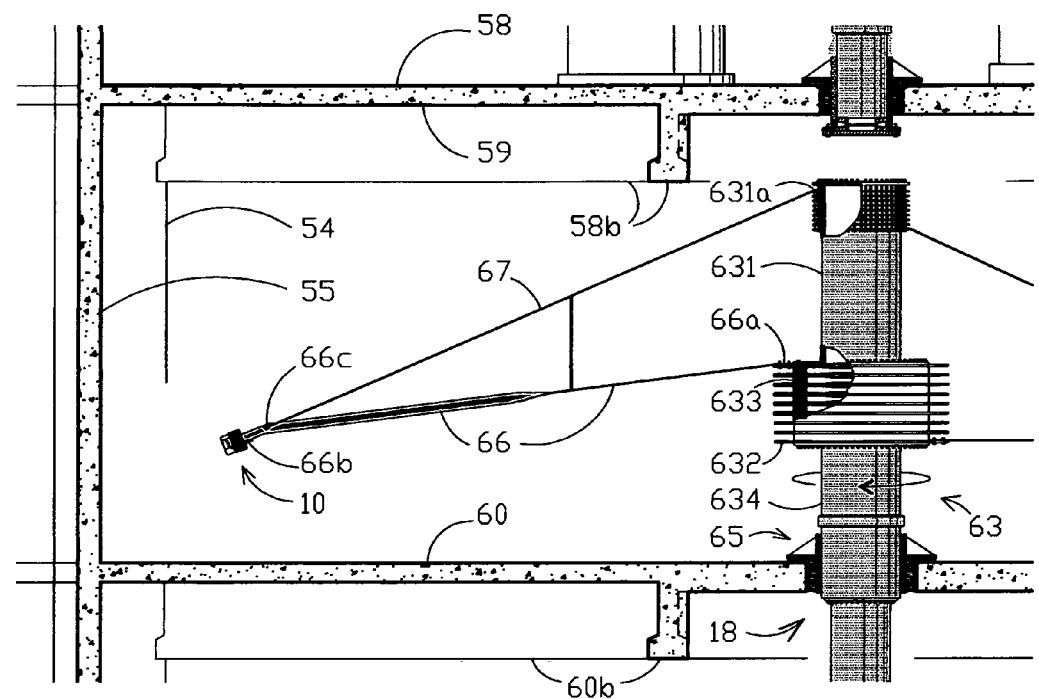
FIG. 10, an enlarged view at point 10 of a mass assembly 68 of FIG. 9.

FIGS. 3, 10 and 11, a high density mass assembly 68 is shown in a larger scale. Said mass assembly or assemblies were made to allow reconfiguration on site, wherein changes on the rotor's payload or capacity may requires. Said mass assembly comprising of a plurality of steel plates 681 with means secured on said effort-end, said means further comprises of a minding plate 682 with an integral locking means 682a. Said minding plate further acts as a fin member and together with a supporting block 683, unitary fastened with nuts and bolts 683a.

An Initiator Drive System

FIGS. 5, 6, 7, 12, 13, 14 and 15, are enlarged partial views of an initiator drive system comprising of a wheel assembly 69, and a plurality of space apart stationary drive assemblies 70. Said stationary drives were attached respectively to the respective said column 54, FIG. 4, and were programmed to operate alternately in concert with each other but preferably with each other group. A group comprising of say three drive assemblies equally spaced apart and made to stays engaged with said wheel assembly, while other groups stay idle for the heat to dissipates and in a timely manner re-engage and to make sure the rotor runs non-stop for a predetermined long duration as typically practiced in the industry.

FIGS. 3, 4, 5, 12, 13 and 15, said wheel assembly 69 comprising of a plurality of spoke member 691, and rim member 692. Each spoke member 691 having a mountable-end 691a mounted radially to said vertical shaft member 63 and having its effort-end 691b connected to the rim member 692, said wheel assembly is positioned leveled with and in between respective group of lever members 66 or mass assemblies 68.

FIGS. 3, 4, 5, 6 and 15, said rim member 692 comprises a corresponding number of elongated strips 692a. Each strips having one end attached to the respective spoke member 691 while its long slender body circumferentially disposed outwardly over-lapping with the adjacent strip member 692a and held by means 693 into a unitary wheel assembly 69.

Figure 15:
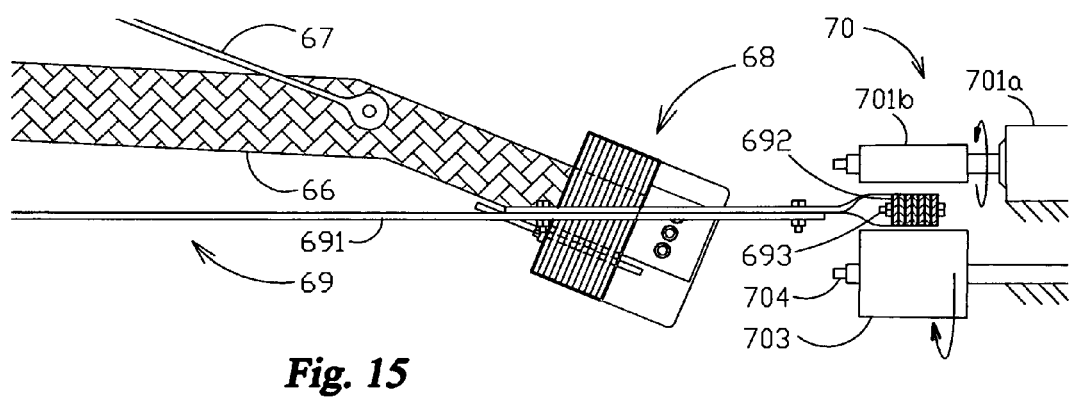
FIG. 15, an enlarged partial view at point 15 of FIG. 14.

FIGS. 3 and 15 are enlarged partial views of a stationary drives 70, each drive assembly 70 comprising of small electric motor 701a connected to the power and equipped with an integral roller-drive 701b. Said roller-drive 701b disposed vertically retractable over rim member 692, through a plate 701c. Plate 701c attached to a stationary mounting means 705, and said mounting means 705 finally attached preferably to the respective column 54.

Idler members 703 were provided supporting said rim member 692 through a stationary shaft member 704, and finally said shaft member 704 is likewise attached to said means 705.

As mentioned previously, said rim member with respective spoke members were disposed leveled with respective said mass assembly or assemblies, so that while the respective roller-drive member drives said rim member circumferentially onward during the operation, said spoke members transfers the forces to the corresponding group of lateral lever members, and that finally equates to a torque or mechanical energy on said rotating vertical shaft member of said rotor.

Electric Generator

Figure 19:
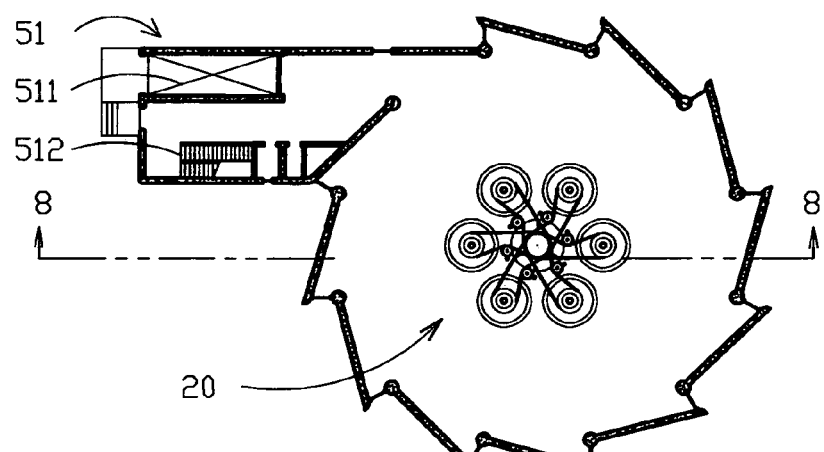
FIG. 19 is a section view thru line 19-19 of FIG. 8, embodied the saft connected to a plurality of electric generator set mounted on said floor by respective drive belt.
Figure 20:
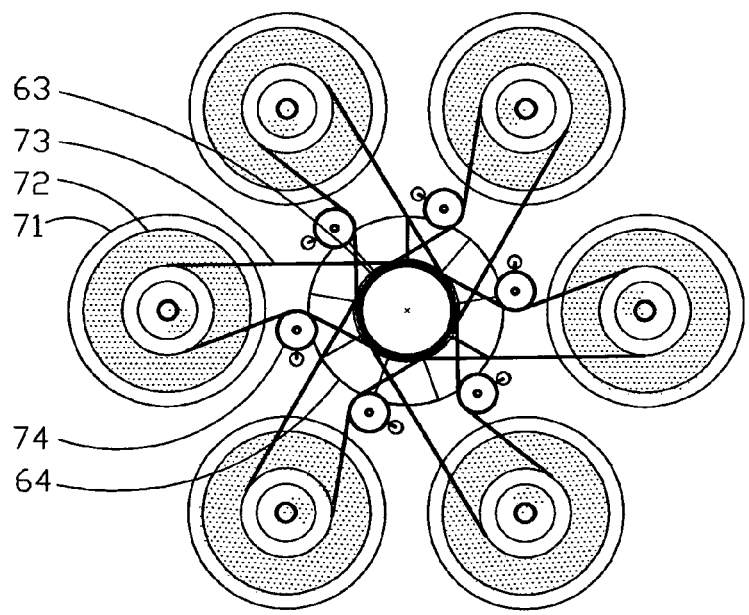
FIG. 20, an enlarged view at point 20 of FIG. 19.
Figure 21:
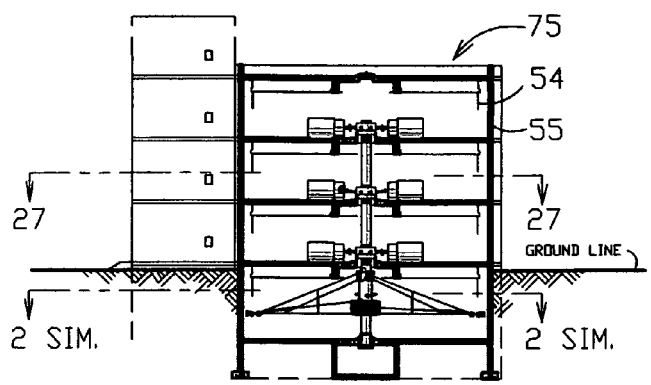
Figure 23:
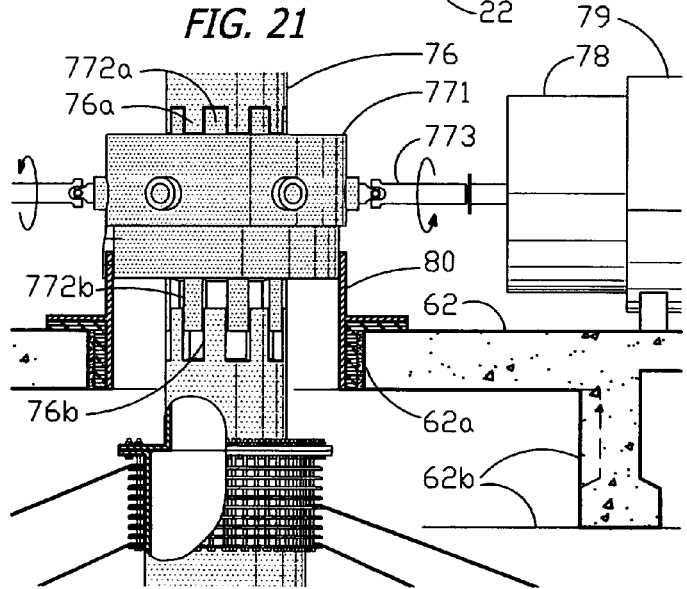
Figure 22:
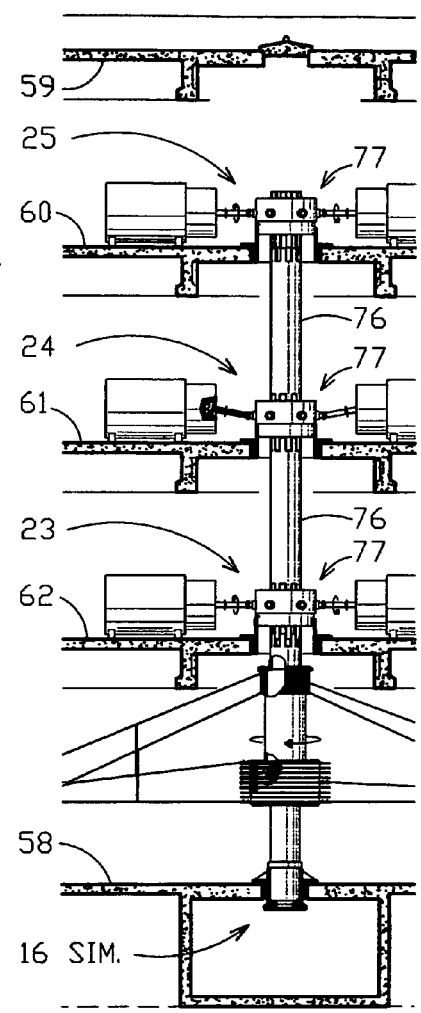
Figure 26:
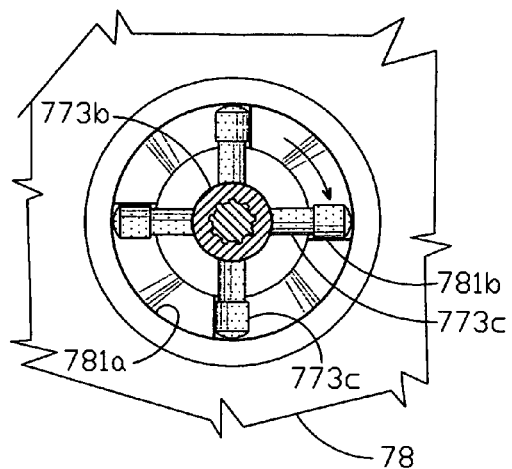
Figure 25:
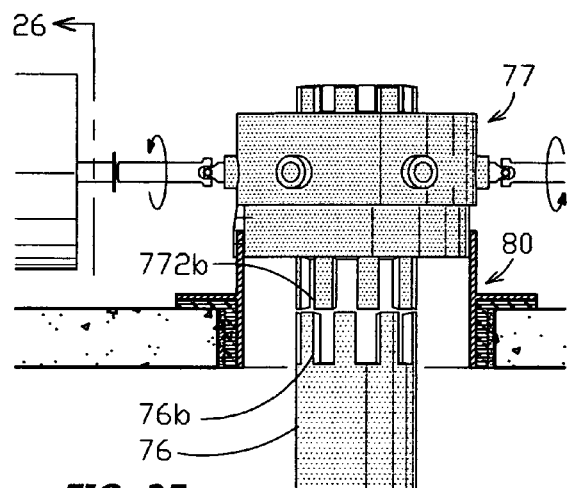
Figure 24:
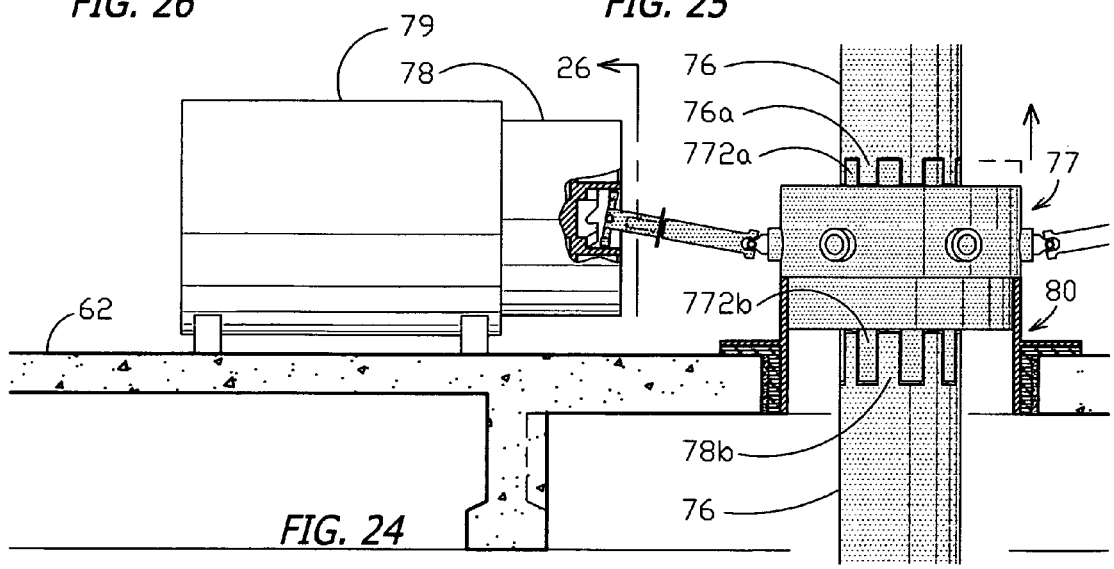
Figure 30:
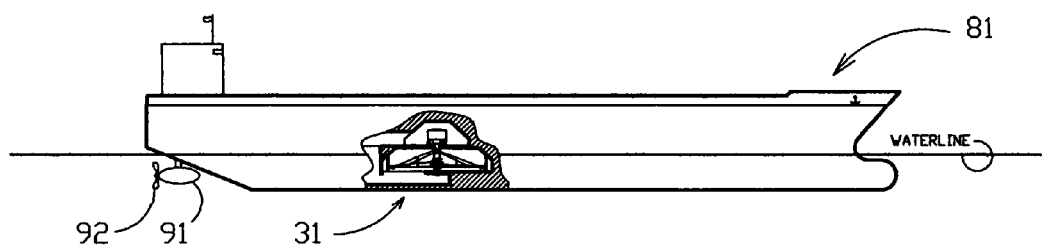
Figure 31:
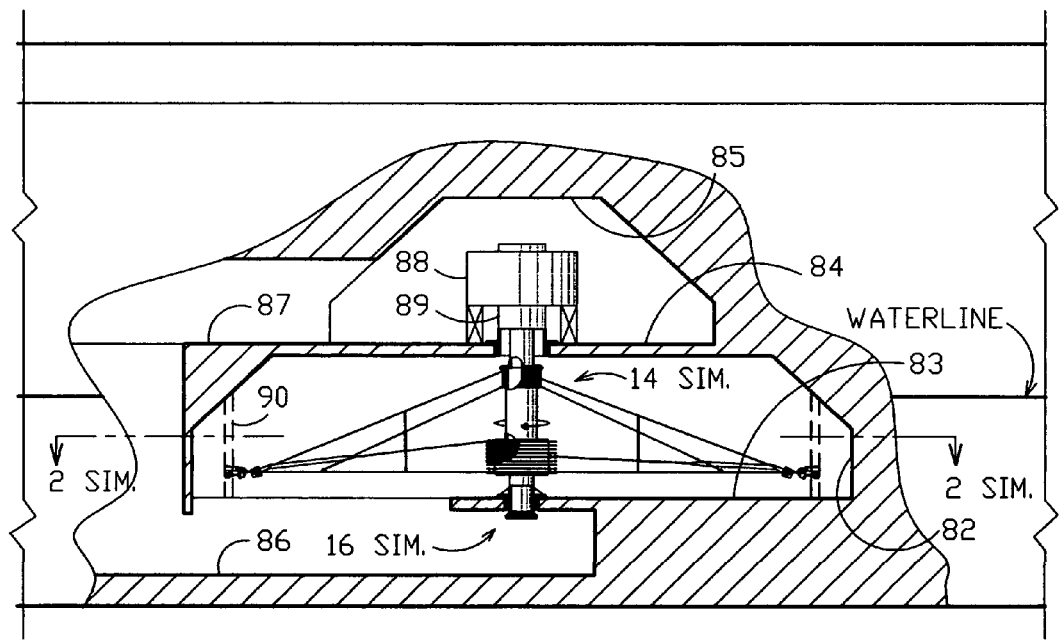

In one particular configuration and as shown in FIGS. 9, 19 and 20, a plurality of floor mounted electric generator sets with appropriate electronic converters were provided, comprising a generator 71, a gearbox 72 and a respective drive belt 73.

Said drive belt transfers the mechanical energy of said rotating vertical shaft member to the respective generator set to generate electricity with help from a retractable idler member 74, and wherein said idler regulates the belt's tension and/or operation from a continuously operating rotor.

Figure 32:
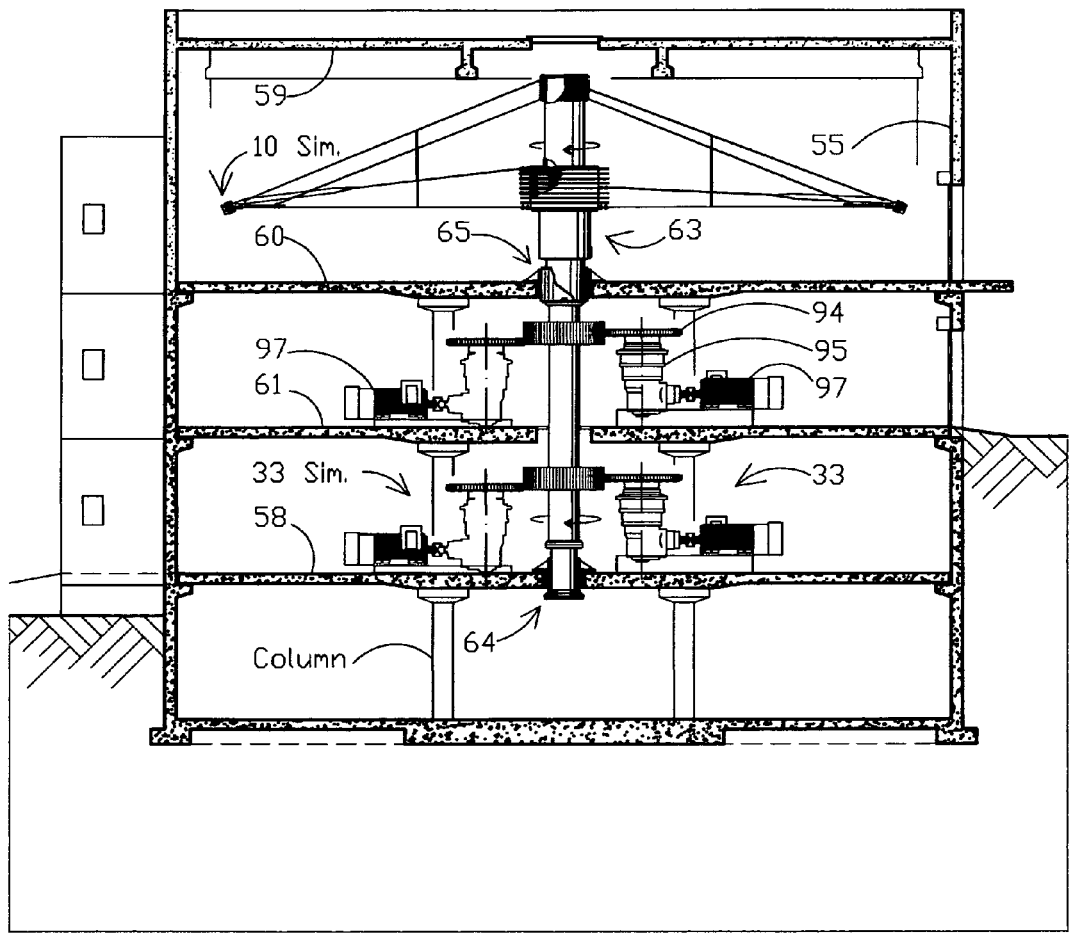
FIG. 32, is a cross section view of a turbine similar to FIG. 8.
Figure 33:
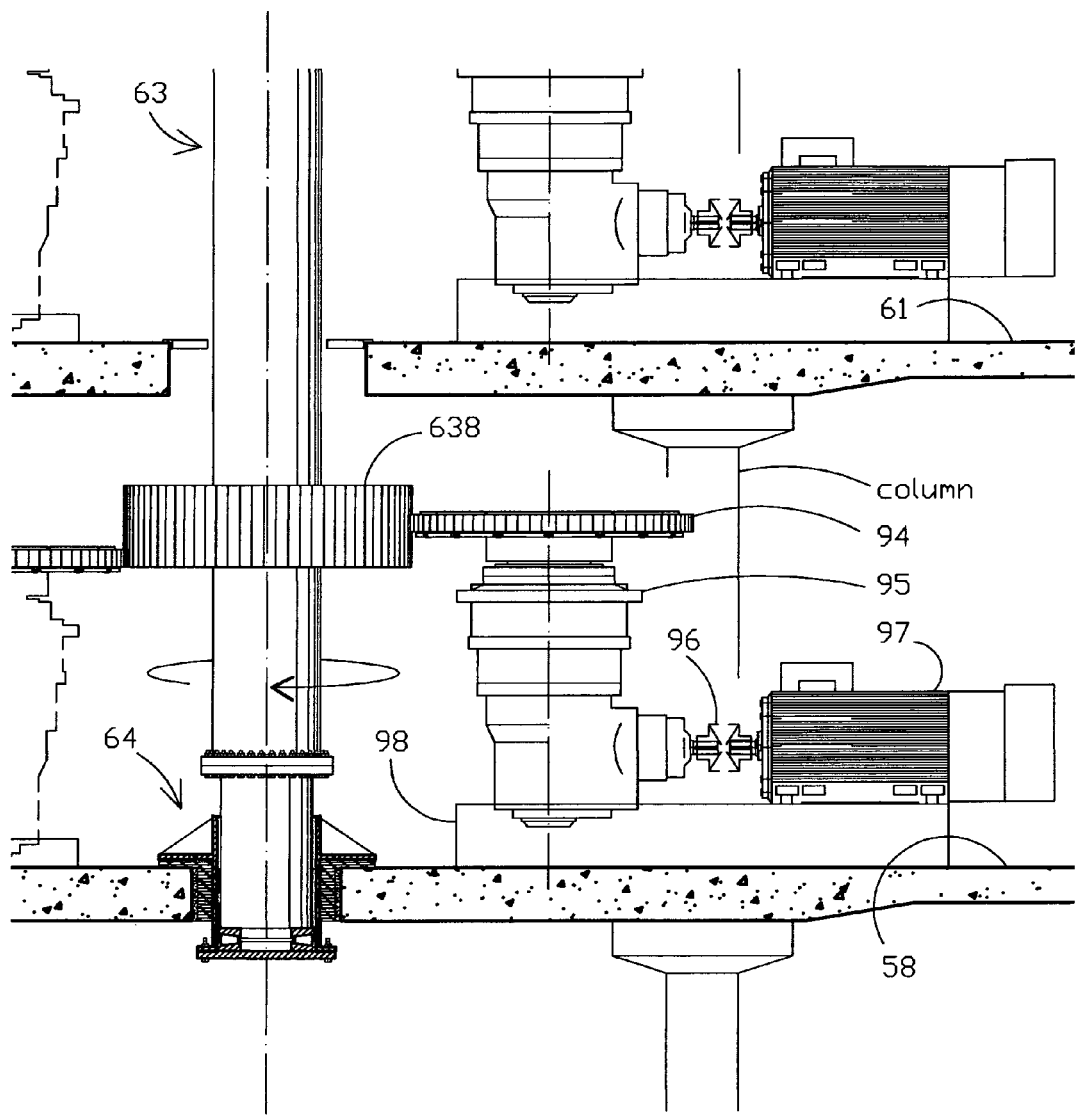
FIG. 33, is an enlarged parial view at point 33 of FIG. 32.

Other means of connecting the vertical shaft member to said generator can be used as well. FIG. 32 is a cross section view of another configuration of turbine, and FIG. 33 is an enlarged partial view at point 33 of FIG. 32, wherein said vertical shaft member 63 is equipped with two drive gears 638. Each drive gear is meshed with or connected to a driven gear 94 but preferably to a plurality of driven gears 94.

Each driven gear 94 is attached coaxially to the input shaft of a gearbox 95. Said gearbox 95 having a horizontal output shaft equipped with means 96 and connected to an electric generator 97. Both the gearbox and the generator are attached to the respective platforms 98, which unitary mounted to the respective floor member 58 and 61.

Brake and Damper Assembly

A brake and damper assembly (not shown on drawing) are beyond the scope of the present invention but it is very important not to operate the rotor without a brake that is working, for the rotor has the potential danger of over-speeding and may compromised the system.

A damper assembly is likewise essential to the success of the turbine, wherein it dynamically balances as needed a relatively large diameter rotor in operation and preventing it from the danger of an excessive vibration. A particular damper assembly was shown and described in a Provisional Application No. 61/403,843, filed Sep. 22, 2010, now a public domain.

Mechanics and Benefits of a Rotor with Potential Energy Gain

Without going into too much details, the calculations that illustrate the mechanics and benefits of the present invention, particularly, a rotor having a radius of 10.00 m, a peripheral high density point mass of 20,000.00 kg, and normally operating at speed of 20 rpm, are as follows;
where:

| | |
|---|---|
| A | approximate skin area of the rotor (areas near the vertical-axis excluded), |
| $a_{fd}$ | acceleration at final displacement in meter per second square, |
| C | drag coefficient — say 2.0, |
| $E_{fd}$ | peripheral output energy at final velocity, |
| $E_i$ | peripheral initial output energy, |
| $F_{fd}$ | force or energy required for the rotor maintaining its final velocity, |
| $F_i$ | initial input force or input energy, |
| J | Joule = Newton-meter, |
| kg | kilogram, |
| MJ | Mega-Joules, |
| m | meter, |
| $m_{fb}$ | friction on bearing in equivalent mass — equation (5), |
| $m_p$ | point mass in kg (mass of levers excluded to simplify the calculations), |
| $m_t$ | assumed total mass of the rotor including the shaft — say 200,000.00 kg, |
| μ | coefficient of friction on bearing — say 0.06, |
| N | Newton or Normal force, |
| Nm | Newton-meter, |
| P | air density — say 1.30 kg/m³, |
| r | radius to the center of a point mass, |
| rad | radian, |
| rpm | revolution per minute, |
| s | second, |
| $v_{fd}$ | angular velocity at final displacement, |
| $v_i$ | initial angular velocity, |
| ½ | a constant. |

$$F_i = [(m_p + m_{fb})(v_i^2/r)] - [-(½ C p A v_i^2)] \quad (1)$$
$$= [(20,000.00 \text{ kg} + 1,200.00 \text{ kg})((0.15 \text{ m/s})^2/10.00 \text{ m})] -$$
$$[-((½)(2.00)(1.30 \text{ kg/m}^3)(600 \text{ m}^2)(0.15 \text{ m/s})^2)]$$
$$= [(21,200.00 \text{ kg})(0.00225 \text{ m/s}^2)] -$$
$$[-((½)(2.00)(1.30 \text{ kg/m}^3)(600 \text{ m}^2)(0.0225))]$$
$$= 48.70 \text{ J} + 17.60 \text{ J}$$
$$= 66.00 \text{ J or N.}$$

$$E_i = ½ m_p r^2 (vi/r)^2 \quad (2)$$
$$= ½ (20,000.00 \text{ kg})(10.00 \text{ m})^2 ((0.15 \text{ m/s})/10.00 \text{ m})^2$$
$$= ½ (20,000.00)(100.00)(0.015 \text{ rad/s})^2$$
$$= 225.00 \text{ J or N.}$$

$$E_{fd} = ½ m_p r^2 (v_{fd}/r)^2 \quad (3)$$
$$= ½ (20,000.00 \text{ kg})(10.00 \text{ m})^2 ((20.933 \text{ m/s})/10.00 \text{ m})^2$$
$$= ½ (20,000.00)(100.00)(2.093 \text{ rad/s})^2$$
$$= 4,381,904.00 \text{ J or N.}$$

$$F_{fd} = [(m_p + m_{fb}) a_{fd}] - [-(½ C p A v_{fd}^2)] \quad (4)$$
$$= [(20,000.00 \text{ kg} + 1,200.00 \text{ kg})(20.933 \text{ m/s}^2)] -$$
$$[-((½)(2.00)(1.30 \text{ kg/m}^3)(600 \text{ m}^2)(20.933 \text{ m/s})^2)]$$
$$= [(21,200.00 \text{ kg})(20.933 \text{ m/s}^2)] -$$
$$[-((½)(2.00)(1.30 \text{ kg/m}^3)(600 \text{ m}^2)(438.19))]$$
$$= 443,780.00 \text{ J} + 341,789.00 \text{ J}$$
$$= 785,569.00 \text{ J or N.}$$

$$M_{fb} = [\mu m_t N/r]/N \quad (5)$$
$$= [(0.06)(200,000.00 \text{ kg})(9.8/10.00 \text{ m}]/9.8$$
$$= 11,760.00 \text{ J}/9.8$$
$$= 1,200.00 \text{ kg.}$$

According to equation (1), having the rotor operating at an initial velocity of say 0.1 5 m/second without the generator load, it requires an input force of 66.00 Nm or J including force to cancel potential frictions, while the corresponding peripheral output energy is equal to 225.00 J, equation (2).

As expected the output energy indeed is greater than the input energy, which equates to a positive difference in quantity of energy or having an energy gain of 159.00 J. This makes the present invention fundamentally cost-effective, as it requires a small initiator drive system to initiates an acceleration and yet eventually maintained the desired velocity.

Overtime and had the rotor reached its desired displacement, the amount of energy it stored due to an increased in velocity is shown in equation (3). While the estimated energy it may consumed just to maintain that velocity is shown in equation (4), which is a significant quantity of energy but being a self-stored energy as it is . . . it cost the system virtually nothing aside from the over-head cost, which is cost competitive as well.

Subtract equations (4) from equation (3) and the quantity of stored energy peripherally is equal to 3,596,335.00 J. Multiply that energy by a radius of 10.00 meters and it equates to a rotor having a potential torque of 35,963,350.00Nm2 or a mechanical energy on a rotating vertical shaft member of said rotor that powers the generators.

Another advantage of this seemingly conventional turbine is—upgrading its capacity is amazingly easy as well. According to Newton's Laws of Motion, by doubling the rpm of the rotor and the output energy quadrupled—so from 35.00 MJ to 143.00 MJ of free energy, clean and potentially reliable.

This versatility in capacity is a big advantage on the present invention over the prior art at least in managing the day-to-day fluctuating nature of energy demand on power plant.

Accordingly the turbine of the present invention potentially having such a quantity of stored energy, enable the power generation system to generate the electricity that could power tens of thousands homes including the turbine itself yet the operation is being maintained by an initiator drive system which surprisingly requires an input force of just 66.00 Nm peripherally.

In practice however a larger input force is recommend, say a group of three equally spaced apart stationary drives equipped with electric motor of say 2 hp each connected to a power, and wherein a stronger stationary drive further facilitate the necessity of a rotor having a longer start-up, reduced to as short as possible.

Abundant Clean Energy

Finally with the rotor connected to the generator, the generator connected to the transformer and finally the transformer connected to the grid at least in ways normal in the industry, renders what becomes a self-renewable power generation system that could supply the economy with potentially abundant clean energy that is cost competitive, reliable and indeed sustainable.

As shown and described what is claimed is:
1. A power generation system comprising:
   an enclosure;
   a rotor with potential energy gain;
   at least one electric generator;
   said enclosure comprising at least:
      a bottom floor;
      a peripheral upright member;
      a ceiling;
      a space created between said bottom floor and ceiling;

said ceiling defined as a predetermined horizontal plane aligned with the upper-end of said rotor;

said rotor with potential energy gain comprising:
a vertical shaft member having an upper-end and lower-end held coaxially pivotal at a predetermined vertical-axis in said enclosure;
a plurality of lateral lever members each having a mountable-end and oppositely an effort-end;
said mountable-end attached to said vertical shaft member at a predetermined distance from its lower-end;
said effort-end configured having a predetermined high density point mass, and wherein said high density point mass disposed to a predetermined effective horizontal path in space about said vertical-axis.

2. The power generation system of claim 1, wherein said enclosure provided with at least one intermediate floor, and wherein a space created between said intermediate floor and bottom floor, and another space created between said intermediate floor and ceiling.

3. The power generation system of claim 1, wherein said vertical shaft member held pivotal by at least one of either said floor.

4. The power generation system of claim 1, wherein said vertical shaft member having its lower-end attached to a pivotal means on said bottom floor, wherein said pivotal means supporting the mass of said vertical shaft member against the gravity, wherein said pivotal means and vertical shaft member unitary extended through said bottom floor, and wherein an access space to facilitate future maintenance of said pivotal means created below said bottom floor.

5. The power generation system of claim 1, wherein said high density point mass defined by a predetermined quantity of matter, and wherein said high density point mass collectively enable said rotor delivered its operational output energy having a rotor of a predetermined radius.

6. The power generation system of claim 1, wherein said effective horizontal path defined by the size of the space about said vertical-axis, and wherein said effective horizontal path enable said rotor achieved its potential energy gain having a rotor of a predetermined high density point mass.

7. The power generation system of claim 1, wherein at least two units of said lateral lever members were combined into an equivalent unitary lateral lever member of a much wider effort-end.

8. The power generation system of claim 1, wherein said lateral lever members were combined into an equivalent circumferentially-unitary lateral lever member and having a predetermined high density rim, wherein said high density rim circumferentially disposed at a predetermined effective horizontal path in pace about said vertical-axis, and wherein at least one circumferentially-unitary lateral lever member attached to said vertical shaft member.

9. The power generation system of claim 1, wherein said vertical shaft member further defined as a means that hold the lateral lever members in placed and enable said rotor delivered an operational torque—regardless of the kind of mounting means employed, regardless of its configuration, and regardless of the material use.

10. The power generation system of claim 1, wherein said lateral lever member further defined as a means that stored an energy gain and collectively enable said rotor delivered an operational torque—regardless of its configuration, regardless of the material use, and regardless of the kind of supporting and mounting means employed.

11. The power generation system of claim 1, wherein said rotor with potential energy gain driven at least initially by an initiator drive system comprising:
a rim member;
a plurality of lateral spoke members each having a mountable-end and oppositely an effort-end;
said mountable-end attached to said vertical shaft member at a predetermined distance from its lower-end;
said effort-end disposed to a predetermined effective horizontal path in space about said vertical-axis, and wherein said effort-end attached to said rim member that unitary defined a wheel assembly;
a plurality of space apart stationary drive assemblies each attached to a respective peripheral upright member supporting said wheel assembly, and wherein said stationary drive assembly in a timely manner drives said wheel assembly about said vertical-axis.

12. The power generation system of claim 1, wherein at least one electric generator mounted on a desired said floor, wherein said generator connected by a means to said vertical shaft member, and wherein said generator uses the mechanical energy of a rotating vertical shaft member to generate electricity.

13. The power generation system of claim 1, wherein at least one said floor provided with a plurality of electric generators each mounted spaced apart around and at a predetermined distance from said vertical shaft member, wherein each generator connected by a means to said vertical shaft member, and wherein each generator uses the mechanical energy of a rotating vertical shaft member to generate electricity.

14. The power generation system of claim 1, wherein a plurality of said rotor with potential energy gain are positioned one next to the other and having a common enclosure.

* * * * *

UNITED STATES PATENT AND TRADEMARK OFFICE
CERTIFICATE OF CORRECTION

PATENT NO. : 8,878,382 B2
APPLICATION NO. : 12/799202
DATED : November 4, 2014
INVENTOR(S) : Carmelito B. Tianchon Page 1 of 1

It is certified that error appears in the above-identified patent and that said Letters Patent is hereby corrected as shown below:

In the Specification

Column 1, line 9, "2009 and;" should read --2009; and--;
        line 63, "F=ma" should (preferably) be shown as --$F = ma$--;
        line 64, "$F=m\ (v^{2/}\ r)$" should read --$F = m\ (v^2/r)$--;
        line 67, "$E=/1;2m\ r^2\ (v/r)^2$" should read --$E = \frac{1}{2}\ m\ r^2\ (v/r)^2$--.

Column 3, line 55, "saft" should read --shaft--.

Column 5, line 26, "66eadapted" should read --66e adapted--.

Column 7, line 51, "$= 1/2\ m_p\ r^2\ (vi/r)^2$" should read --$= \frac{1}{2}\ m_p\ r^2\ (v_i/r)^2$--.

Column 8, line 23, "35,963,350.00Nm2" should read --35,963,350.00Nm$^2$--.

Signed and Sealed this
Thirtieth Day of December, 2014

Michelle K. Lee
*Deputy Director of the United States Patent and Trademark Office*